United States Patent [19]

Smith

[11] Patent Number: 4,964,462
[45] Date of Patent: Oct. 23, 1990

[54] TUBING COLLAR POSITION SENSING APPARATUS, AND ASSOCIATED METHODS, FOR USE WITH A SNUBBING UNIT

[76] Inventor: Michael L. Smith, P.O. Box 249 (County Rd. 38), Banquete, Tex. 78339

[21] Appl. No.: 391,488

[22] Filed: Aug. 9, 1989

[51] Int. Cl.$^5$ ............... E21B 47/09; G01B 7/00; G01V 3/26
[52] U.S. Cl. .................... 166/255; 166/66; 166/66.5
[58] Field of Search .............. 166/255, 250, 66.5, 166/66, 65.1, 367; 175/40, 45; 73/151; 324/208, 219, 258, 83 A, 144, 145

[56] References Cited

U.S. PATENT DOCUMENTS

| | | | |
|---|---|---|---|
| 3,106,960 | 10/1963 | Doak | 166/66 |
| 3,410,355 | 11/1968 | Garrett | 175/40 |
| 3,488,578 | 1/1970 | Stigmark | 324/208 |
| 3,843,923 | 10/1974 | deVries et al. | 166/66 X |
| 3,857,089 | 12/1974 | Adler et al. | 324/208 |
| 3,890,607 | 6/1975 | Pelenc et al. | 324/208 X |
| 4,110,688 | 8/1978 | Bailey | 166/66.5 X |
| 4,121,657 | 10/1978 | McClure | 166/66 |
| 4,206,810 | 6/1980 | Blackman | 166/336 |
| 4,244,424 | 1/1981 | Talbot | 166/66 |
| 4,291,761 | 9/1981 | Watson | 166/66.5 X |
| 4,629,983 | 12/1986 | Boomgaard et al. | 324/208 X |
| 4,634,126 | 1/1987 | Kimura | 324/208 X |
| 4,668,465 | 5/1987 | Boomgaard et al. | 324/208 X |
| 4,694,902 | 9/1987 | Hörmansdörfer | 166/250 |
| 4,708,204 | 11/1987 | Stroud | 166/255 |

Primary Examiner—Stephen J. Novosad
Attorney, Agent, or Firm—Hubbard, Thurman, Turner, Tucker & Harris

[57] ABSTRACT

A snubbing unit, used to raise or lower a collar-connected series of tubing joints through a riser spool communicating with a well bore, is provided with an electromagnetic sensing system operative to detect and indicate the entry into, position within and travel direction within a sensing spool between the upper and lower blowout preventers of each tubing collar. The sensing system includes upper and lower electromagnetic coils coaxially circumscribing the sensing spool, and a frequency generator for energizing the coils. First and second phase comparators are used to detect current phase alterations in the coils, caused by variations in the vertical proximity between each collar and the coils, and responsively transmit output signals indicative of such phase alterations. The output signals are sent to a position sensing circuit which utilizes them to illuminate collar position and travel direction lights on an operator control panel.

24 Claims, 5 Drawing Sheets

TUBING COLLAR POSITION SENSING APPARATUS, AND ASSOCIATED METHODS, FOR USE WITH A SNUBBING UNIT

BACKGROUND OF THE INVENTION

The present invention relates to generally to (but is not limited to) snubbing units which are used to vertically move a tubing string, formed from a series of tubing joints serially interconnected by larger diameter threaded tubing collars, into and out of a pressurized well bore. In a preferred embodiment thereof, the present invention more particularly provides a snubbing unit having incorporated therein a tubing collar position sensing system which is operative to detect, during upward or downward tubing string travel, the presence and position of each tubing collar between the upper and lower blowout preventers, and the vertical movement direction of the collars relative to the blowout preventors.

The typical snubbing unit utilized to vertically move a jointed tubing string into and out of a pressurized well bore moves the tubing string through a stationary riser spool on which vertically spaced upper and lower blowout preventers (BOP's) are operatively mounted. As is well known in this art, the BOP's are used to isolate the interior of the riser spool portion above them (normally at ambient pressure) from the much higher well pressure in the riser spool portion below them, while at the same time being openable and closable in "air lock" fashion to permit sequential passage therethrough of the series of tubing joint collars. Each BOP is sized so that in its closed position it forms a sliding pressure seal around the tubing joint being moved therethrough, and in its open position permits passage therethrough of the larger diameter tubing collar.

During lowering of a particular tubing collar toward the upper BOP, the upper BOP is open, and the lower BOP is closed. When the collar enters the intermediate riser spool portion between the upper and lower BOP's downward tubing string travel is halted and the upper BOP is closed. The interior of the intermediate riser spool portion is then brought to well pressure by opening an equalizing valve to communicate the intermediate riser spool portion with such well pressure. After this pressure equalization is achieved, the lower BOP is opened and the tubing string is further lowered to move the collar downwardly past the open lower BOP. The lower BOP is then closed, and the interior of the intermediate riser spool portion is vented to atmosphere by opening a bleed-off valve operatively connected to the intermediate riser spool portion. The upper BOP is then opened to ready the intermediate riser spool portion for downward receipt of the next tubing collar. A reverse sequence of BOP opening and closing, and pressurization and depressurization of the intermediate riser spool portion interior is, of course, utilized as the tubing string is being moved upwardly through the riser spool by the snubbing unit.

In the snubbing operation just described, it is critically important to temporarily terminate vertical tubing string movement after each tubing collar has entered the intermediate riser spool section through the open BOP, and before the collar strikes the closed BOP, to permit the necessary condition reversal of the BOP's and the pressurization of depressurization of the intermediate riser spool portion interior. Failure to temporarily stop each tubing collar at this position, as is well known, can cause severe disruptions of and lengthy delays in the snubbing operation.

For example, during forcible lifting of the tubing string through the riser spool, if a tubing collar is not stopped upon its upward entry into the intermediate riser spool portion is forcibly strikes the underside of the closed upper BOP. The continuing lifting force on the tubing string above the closed upper BOP can easily tear the tubing string apart at the jammed collar, thereby permitting the entire lower portion of the string to fall to the bottom of the well bore and causing a well blowout through the upper BOP. Also, if the tubing is being forcibly lowered through the riser spool, and a tubing collar strikes the closed lower BOP, the portion of the tubing string above the jammed collar can be easily crumpled and wedged within the riser spool.

The requisite precise positioning, and temporary stoppage, of each vertically successive tubing collar within the intermediate riser spool portion has heretofore been rendered somewhat difficult for two primary reasons. First, after each tubing collar enters the riser spool it can no longer be seen by the snubbing unit operator. Second, there is often at least a slight variation in the collar-to-collar lengths in the tubing string—arising both from tubing joint length variances and variances in the depths to which the joint ends are threaded into their associated collars. Accordingly, it has been previously necessary for the snubbing unit operator to laboriously keep track of each successive collar-to-collar length in the tubing string to facilitate the essentially "blind" placement and stoppage of each collar within the intermediate riser spool portion. A slight calculation error, or an attention lapse by the snubbing unit operator, can thus easily cause breakage or crumpling of the tubing string.

From the foregoing it can be readily seen that a need exists for an improved and more reliable method of correctly positioning and temporarily stopping each successive tubing collar within the intermediate riser spool portion. It is accordingly an object of the present invention to provide such a method, and apparatus for effecting it.

SUMMARY OF THE INVENTION

In carrying out principles of the present invention, in accordance with a preferred embodiment thereof, a snubbing unit is provided in which collar sensing means are associated with the intermediate riser spool portion between the upper and lower BOP's, and are uniquely operative to sense the entry of each tubing collar into the intermediate riser spool portion, its vertical position therein, and its vertical direction of travel therethrough. Output signals, indicative of these positional and directional characteristics of the collars, are generated from the sensing means and permit the snubbing unit operator to continuously and accurately monitor this critical phase of the snubbing operation. The sensing means output signals may also be used in conjunction with collar counter means to monitor and record the total tubing string length which has upwardly or downwardly traversed the intermediate riser spool portion.

The intermediate riser spool portion is, in the present invention, used as a collar sensing spool and is preferably formed from a non-magnetic material such as stainless steel. In a preferred embodiment thereof, the collar sensing means also include upper and lower electric induction coils which outwardly and coaxially circumscribe the sensor spool through which the tubing collars pass. Electrical frequency generator means are connected to the coils to flow through each of them an electrical current having a predetermined base frequency.

First phase comparator means are interconnected between the upper position sensing coil and the frequency generator means, and are operative to generate a first output signal indicative of the coil power phase alteration corresponding to variation in the degree of vertical proximity between the first coil and a tubing collar vertically traversing the sensor. In a similar fashion, second phase comparator means are interconnected between the frequency generator means and the lower position sensing coil, and are operative to generate a second output signal indicative of the coil power phase alteration corresponding to variation in the degree of vertical proximity between the second coil and the tubing collar.

The first and second output signals are transmitted to position indicating circuit means which compare the two signals and responsively operate collar position and travel direction lights on a suitable control panel, thereby conveniently informing the snubbing unit operator as to when a particular tubing collar enters the sensing spool, where it is in the spool, and in which direction it is moving through the spool.

As a particular downwardly moving tubing collar approaches the upper position sensing coil, the first output signal begins to increase to a maximum value occurring when the collar is vertically centered within the upper coil. Slightly before such centering, an "upper coil" position light on the control panel is illuminated. Further downward collar movement sequentially illuminates a "lower coil" position light on the control panel when the collar is centered between both coils, turns off the "upper coil" light when the collar is centered within the lower coil, and turns off the "lower coil" light as the collar downwardly exits the sensing spool. This sequence is, of course, reversed when a particular tubing collar upwardly traverses the sensing spool.

Incorporated into the position indicating circuitry is a portion which monitors the sequence in which the first and second output signals are brought to their maximum values, and responsively illuminates an "up" or "down" light on the control panel to indicate to the snubbing unit operator the vertical direction of collar travel through the sensing spool. In this manner the operator is provided with precise information regarding collar entry, position and travel direction, thereby eliminating the previous necessity of keeping track of each collar-to-collar tubing string length.

The position indicating circuitry may be augmented, if desired, as an optional feature of the present invention to automatically provide tubing string movement lockout if the BOP's are not in their proper open or closed positions, and also to provide such movement lockout when each tubing collar becomes vertically centered between the upper and lower position sensing coils. As a further optional feature of the present invention, additional useful system condition information may be incorporated into the control panel by outputting to the control panel position signals from the levers used to hydraulically operate the BOP's and the bleed-off and equalizing valves, and riser spool pressure signals from above, within and below the sensing spool, to operate condition lights positioned on the control panel and indicating whether each of the BOP's, and the bleed-off and equalizing valves is open or closed.

While in the preferred embodiment of the present invention two vertically stacked position sensing coils are utilized, a greater or lesser number of such coils could be used if desired. For example, if a somewhat simpler collar entry-and-position only system is desired, a single position sensing coil could be used. On the other hand, if somewhat greater collar position sensing accuracy is desired, one or more additional position sensing coils could be used.

DETAILED DESCRIPTION

Figure 1:
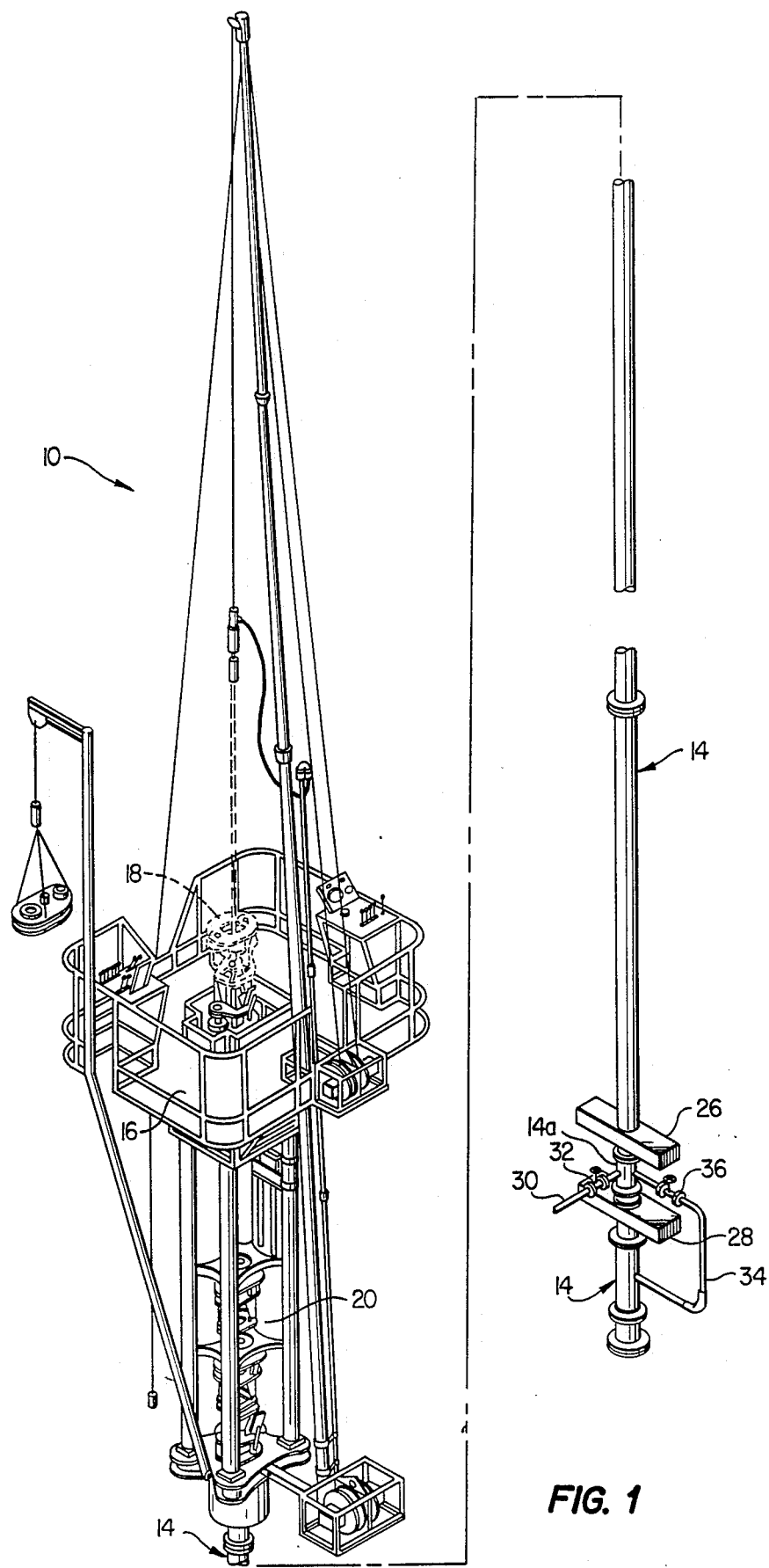
FIG. 1 is a vertically foreshortened, somewhat schematic perspective view of a snubbing unit which incorporates therein a tubing collar position sensing system embodying principles of the present invention.

Referring initially to FIGS. 1–3A, the present invention provides a snubbing unit 10 (FIG. 1) which is utilized to vertically move a tubing string 12 into and out of a well bore (not illustrated) through a vertically disposed riser spool 14. Except for features of the present invention incorporated therein and described below, the snubbing unit 10 is of a generally conventional construction and includes an elevated operator platform 16, positioned above the upper end of the riser spool 14, and the usual tubing string lifting and lowering structure including upper and lower slip bowl assemblies 18 and 20.

The tubing string 12 is formed from a series of metal tubing joints 22 which are threadedly interconnected end-to-end by a series of internally threaded, larger diameter metal tubing collars 24, only one of which is illustrated in the drawings. Vertically spaced upper and lower blowout preventers 26 and 28 are operatively installed in the riser spool 14 at opposite ends of an intermediate riser spool section $14_a$ which, as later described, functions as a collar position sensing spool and is formed from a nonmagnetic material, preferably stainless steel.

A pressure bleed line 30, having a bleed-off valve 32 installed therein, is connected to the intermediate riser spool section $14_a$ and communicates with its interior. Additionally, the interiors of the intermediate riser spool section $14_a$ and a portion of the riser spool disposed beneath the lower blowout preventer 28 are intercommunicated through a pressure equalizing line 34 in which an equalizing valve 36 is operatively installed.

Figure 2:
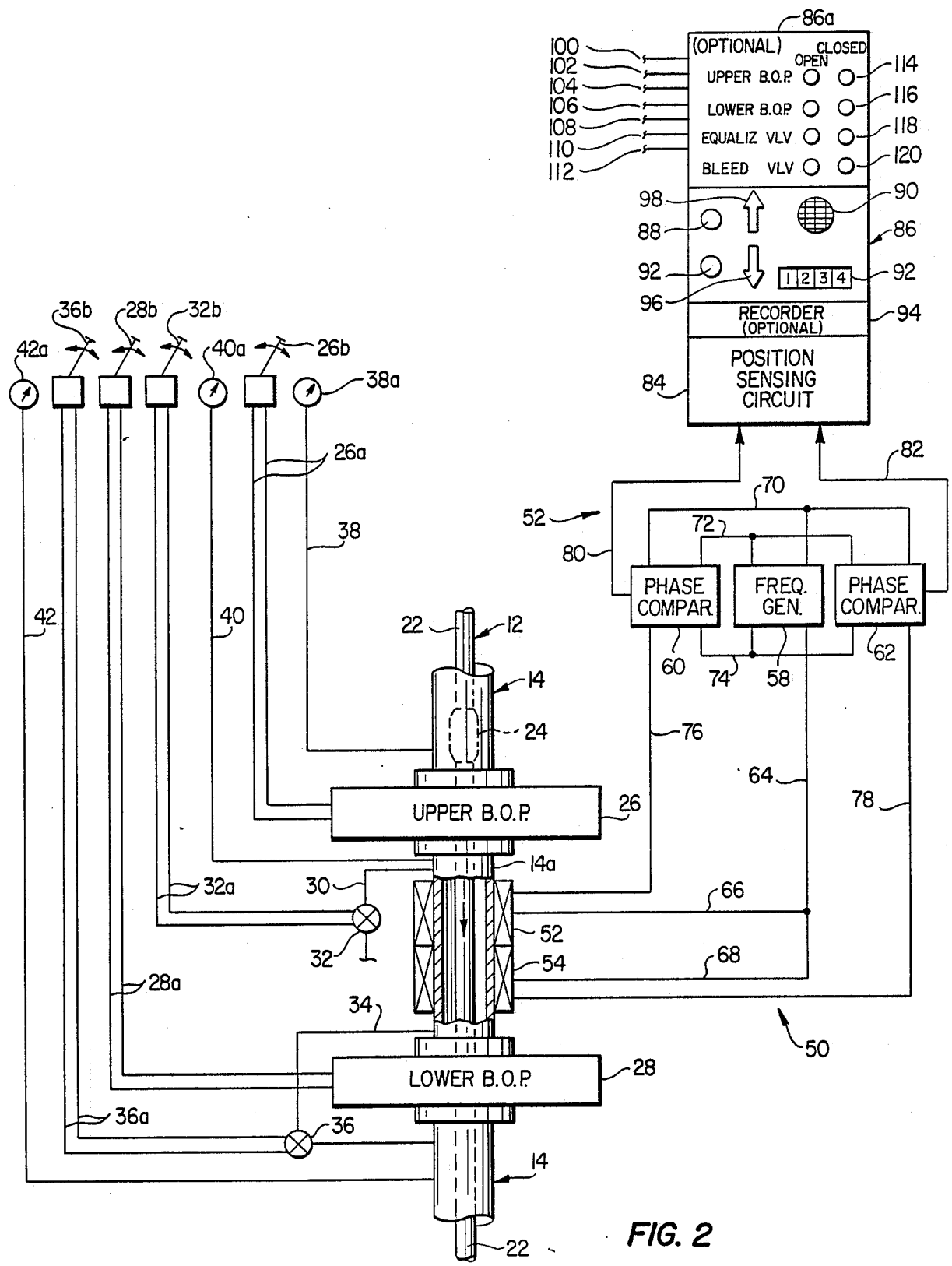
FIG. 2 is a schematic diagram, partially in cross-section, of the collar position sensing system together with associated control and position indicating circuitry.

As schematically illustrated in FIG. 2, the upper and lower blowout preventers 26 and 28, the bleed-off valve 32, and the equalizing valve 36 are selectively openable and closable by means of hydraulic line sets $26_a$, $28_a$, $32_a$, and $36_a$ which are respectively provided with associated operator control handles 26$_b$, 28$_b$, 32$_b$, and 36$_b$. For purposes later described, pressure sensing lines 38, 40 and 42 are provided with associated pressure gauges 38$_a$, 40$_a$ and 42$_a$, and are respectively communicated with the interior of a riser spool portion above the upper blowout preventer, the intermediate riser spool section 14$_a$, and a portion of the riser spool disposed beneath the lower blowout preventer.

In a conventional fashion, the upper and lower blowout preventers 26, 28 are individually closable to form sliding pressure seals around a tubing joint portion of the tubing string 12, and are individually openable to permit axial passage of the larger diameter tubing collar 24 therethrough.

As the tubing string 12 is, for example, being lowered through the riser spool 14 into the well bore and the tubing collar 24 is downwardly approaching the upper blowout preventer 26 (FIG. 2), the upper blowout preventer 26 is open, and the lower blowout preventer 28 is closed. Upon entry to the tubing collar 24 into the intermediate riser spool section 14$_a$ (FIGS. 3A and 3B), further downward movement of the tubing string 12 is temporarily halted (FIG. 3B) and the upper blowout preventer 26 is closed. The equalizing valve 36 (FIG. 2) is then opened to controllably elevate the pressure within the intermediate riser spool section 14$_a$ to that of the well pressure.

Next, the lower blowout preventer 28 is opened, and downward tubing string movement is resumed (FIG. 3C) to pass the tubing collar 24 downwardly through the now-opened lower blowout preventer 28. When the tubing collar 24 has downwardly passed the lower blowout preventer, the lower blowout preventer is closed, and the bleed-off valve 32 (FIG. 2) is opened to vent the interior of the intermediate riser section 14$_a$ to atmospheric pressure. Finally, the upper blowout preventer 26 is again opened to ready the system for the vertical movement of another tubing joint 22 and collar 24 through the intermediate riser spool section 14$_a$. This described sequence of the opening and closing of the blowout preventers and the bleed-off and the equalizing valves is, of course, reversed when the tubing string 12 is being moved upwardly through the riser spool 14.

In the snubbuing operation just described, upon entry of a tubing collar 24 into the intermediate riser spool section 14$_a$ through an opened blowout preventer, it is critically important that the tubing collar be stopped before it forcibly strikes the closed blowout preventer which it is approaching. For example, if the tubing string 12 is being forcibly driven downwardly through the riser spool and is permitted to strike the closed lower blowout preventer, a portion of the tubing string above the collar can easily be crumpled and wedged within the riser spool. If, on the other hand, the tubing string is being forcibly lifted through the riser spool and the collar strikes the closed upper blowout preventer, the tubing string can easily be ripped apart at the jammed collar, thereby creating a blowout condition and permitting a lower tubing string portion to fall into the well bore.

Despite the criticality of stopping each tubing collar within the intermediate riser spool section 14$_a$ to prevent the entering collar from striking the closed blowout preventer, in conventional snubbing operations this collar stoppage is not always reliably effected. This is due to the fact that the collars entering and traversing the intermediate riser spool section 14$_a$ cannot be seen by the snubbing unit operator. Accordingly, proper placement and stoppage of each collar within the intermediate riser spool section has heretofore been accomplished by keeping track of the collar-to-collar distance of each tubing joint 22.

However, as is well known, these lengths tend to vary since the tubing joints are usually field cut, and the distance into its collar which each tubing joint is threaded can also vary. Accordingly, a slight measurement inaccuracy, or a mental lapse on the part of the snubbing unit operator could heretofore cause undesirable forcible contact between a tubing collar and a closed blowout preventer.

In the present invention, however, this potentially serious problem is effectively eliminated by the provision of a unique collar position sensing system 50 (FIG. 2) which, as will be seen, detects and indicates the entry of a tubing collar 24 into the intermediate riser spool section 14$_a$, the vertical position of the tubing collar within the riser spool section, and the vertical direction of travel of the tubing collar through the intermediate riser spool section. Accordingly, the sensing system 50 of the present invention permits the snubbing unit operator to reliably and precisely position and stop each successive tubing collar 24 whithin the intermediate riser spool section 14$_a$ irrespective of variations in collar-to-collar tubing string lengths and without the previous necessity of measuring and remembering such differing lengths.

In the illustrated preferred embodiment thereof, the collar position sensing system 50 includes the intermediate riser spool section 14$_a$ which is used as a position sensing spool and is formed from a nonmagnetic material, preferably stainless steel. Secured to and coaxially circumscribing a longitudinally central portion of the riser spool section 14$_a$ are schematically depicted upper and lower electric induction coils 52 and 54. Comparator circuit means 56 are operatively associated with the upper and lower electric induction coils 52 and 54, and include a frequency generator 58 and a pair of phase comparators 60 and 62.

The frequency generator 58 is operative to supply electrical power to the upper and lower induction coils 52, 54 via leads 64, 66 and 68, and is additionally interconnected as shown with the phase comparators 60, 62 by leads 70, 72 and 74. Additionally, the phase comparator 60 is connected to the upper induction coil 52 by a lead 76, and the phase comparator 62 is connected to the lower induction coil 54 by a lead 78.

With each of the induction coils 52, 54 energized by the frequency generator 58, and the tubing string 12 being vertically moved through the riser spool 14 (for example in the downward direction representatively illustrated in FIG. 2), the phase comparators 60, 62 are respectively operative to detect power phase shifts at the induction coils, attributable to variations in the vertical position of the tubing collar 24 relative to the coils, and responsively generate output signals 80 and 82 which are respectively indicative of the power phase shifts at coils 52 and 54. The output signals 80, 82 are transmitted to a position sensing circuit portion 84 of a control panel 86, and are combinatively indicative of collar entry into riser spool section 14$_a$, the vertical position of the collar in riser spool section 14$_a$, and the direction of vertical travel of the collar through riser spool section 14$_a$. Position sensing circuit 84 may optionally be incorporated into a suitable microprocessor if desired.

With the tubing collar 24 positioned above the spool section 14$_a$ (FIG. 2), and only a portion of a tubing joint 22 disposed therein, the power phase shift at each coil 52, 54 (compared to the power phases at each coil with the tubing string withdrawn from the intermediate riser spool section) are essentially equal, as are the strengths of the output signals 80, 82. However, when the tubing collar 24 downwardly enters the intermediate riser spool section 14$_a$ and closely approaches the upper coil 52 the output signal 80 begins to increase due to the increase in power phase shift at the upper coil 52. As the tubing collar 24 approaches its generally centered position relative to the upper coil 52 (FIG. 3A) the strength of the output signal 80 increases relative to the output signal 82. When the output signal 80 is increased to a predetermined magnitude, the position sensing circuit 84 operates to illuminate an "upper coil" light 88 on the control panel 86, thereby visually indicating to the snubbing unit operator that the tubing collar 24 has downwardly entered the intermediate riser spool section 14$_a$. A corresponding audible collar entry signal may also be generated through a speaker or horn portion 90 on the control panel 86.

Figure 3C:
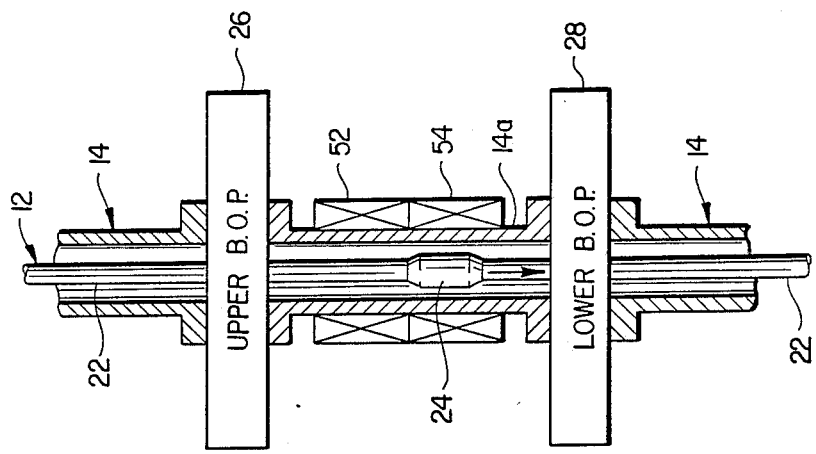
FIGS. 3A–3C are schematic cross-sectional views through a sensing spool portion of the collar position sensing system, and sequentially illustrate three representative positions of a tubing collar as it is passed downwardly through the sensing spool.
Figure 3B:
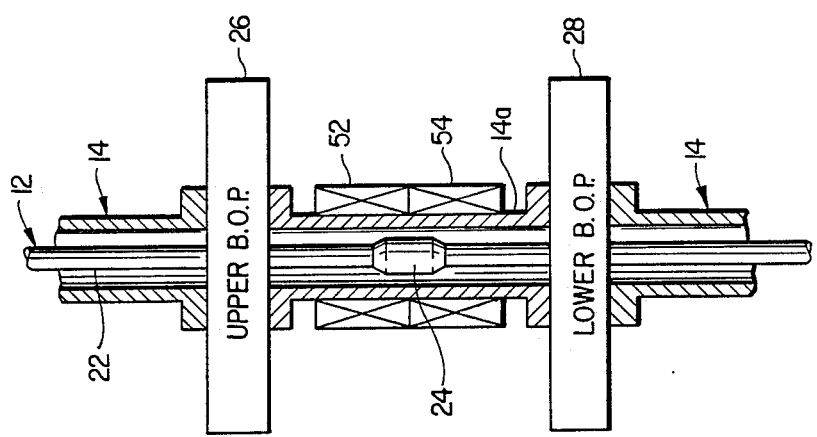
Figure 3A:
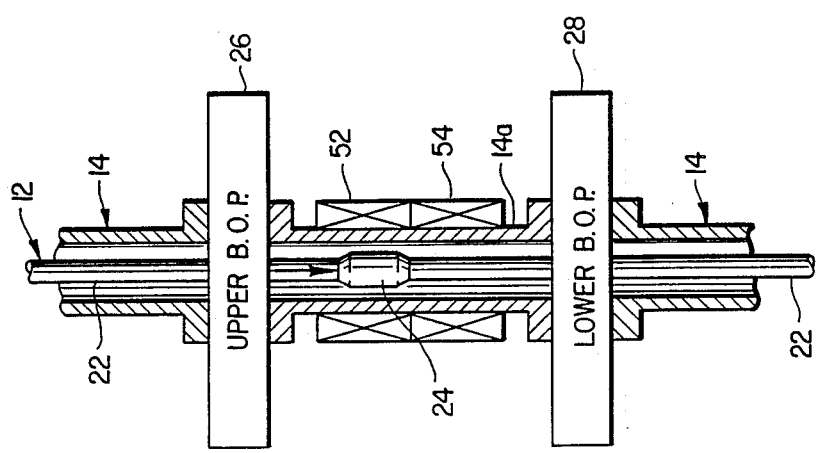

As the tubing collar 24 is moved downwardly from its FIG. 3A to its FIG. 3B position, in which the collar is generally vertically centered between the upper and lower coils 52 and 54, the phase shift output signal 80 decreases, and the strength of the phase shift output signal 82 increases until the signals 80, 82 are equalized. At this time, the circuit 84 additionally illuminates a "lower coil" light 92 on the control panel 86, indicating to the snubbing unit operator that the tubing collar 24 is vertically centered within the intermediate riser spool section 14$_a$, and it is time to temporarily stop downward tubing string travel to permit the previously described sequencing of the blowout preventers, the bleed-off valve and the equalizing valve to permit movement of the collar 24 through the lower blowout preventer 28.

When the lower blowout preventer 28 is subsequently opened, the tubing collar 24 is moved downwardly from its coil-centered FIG. 3B position as indicated in FIG. 3C in which the collar is generally centered relative to the lower coil 54. When the collar is generally centered in this manner relative to the lower coil, the power phase shift at the upper coil, and the strength of the output signal 82, have been decreased, and the strength of output signal 80 has been increased to an extent such that the circuit 84 turns off the upper coil light 88 so that only the lower coil light 92 is still illuminated. This indicates to the snubbing unit operator that the collar 24 is in a lower portion of the intermediate riser spool section 14$_a$ and has downwardly passed the upper coil. Further downward movement of the tubing collar outwardly through the opened lower blowout preventer 28 progressively decreases the strength of output signal 80 until, with the collar moved downwardly passed the lower blowout preventer, the lower coil light 92 is also turned off. This indicates to the snubbing unit operator that the collar has completely exited the intermediate riser spool section 14$_a$.

The downward traversal of each of the coils 52, 54 by the collar 24, via the circuit 84, incrementally advances a counter portion 92 of the control panel 86 to give to the snubbing unit operator a running visual indication of the total number of collars which have been passed downwardly through the riser spool section 14$_a$. The total number of such collar passages may be conveniently recorded for future reference on an optional recorder portion 94 of the control panel 86.

Figure 4A:
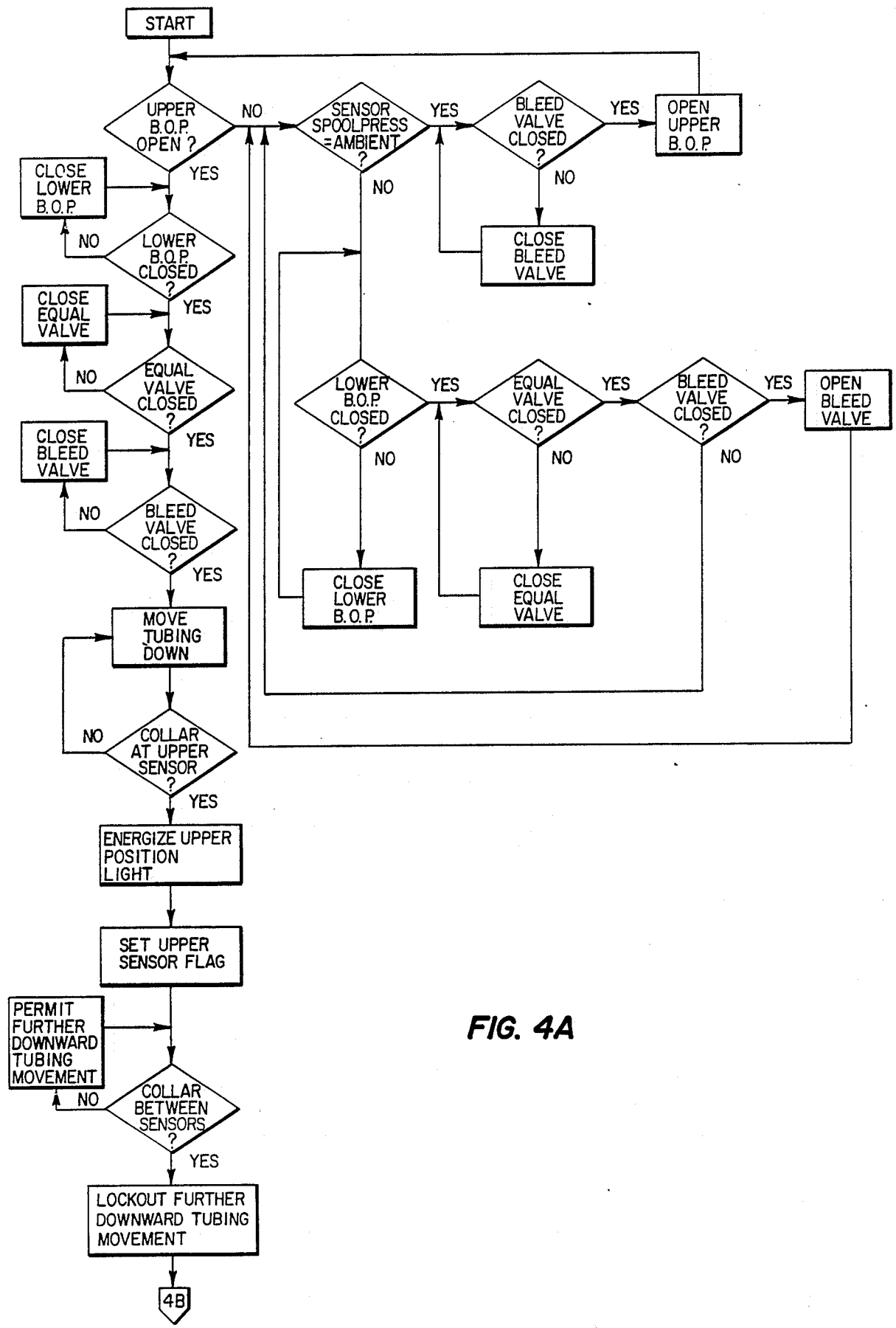
FIGS. 4A and 4B, collectively, are a schematic logic diagram illustrating representative control and safety circuitry which may optionally be incorporated in a microprocessor portion of the collar position sensing system.
Figure 4B:
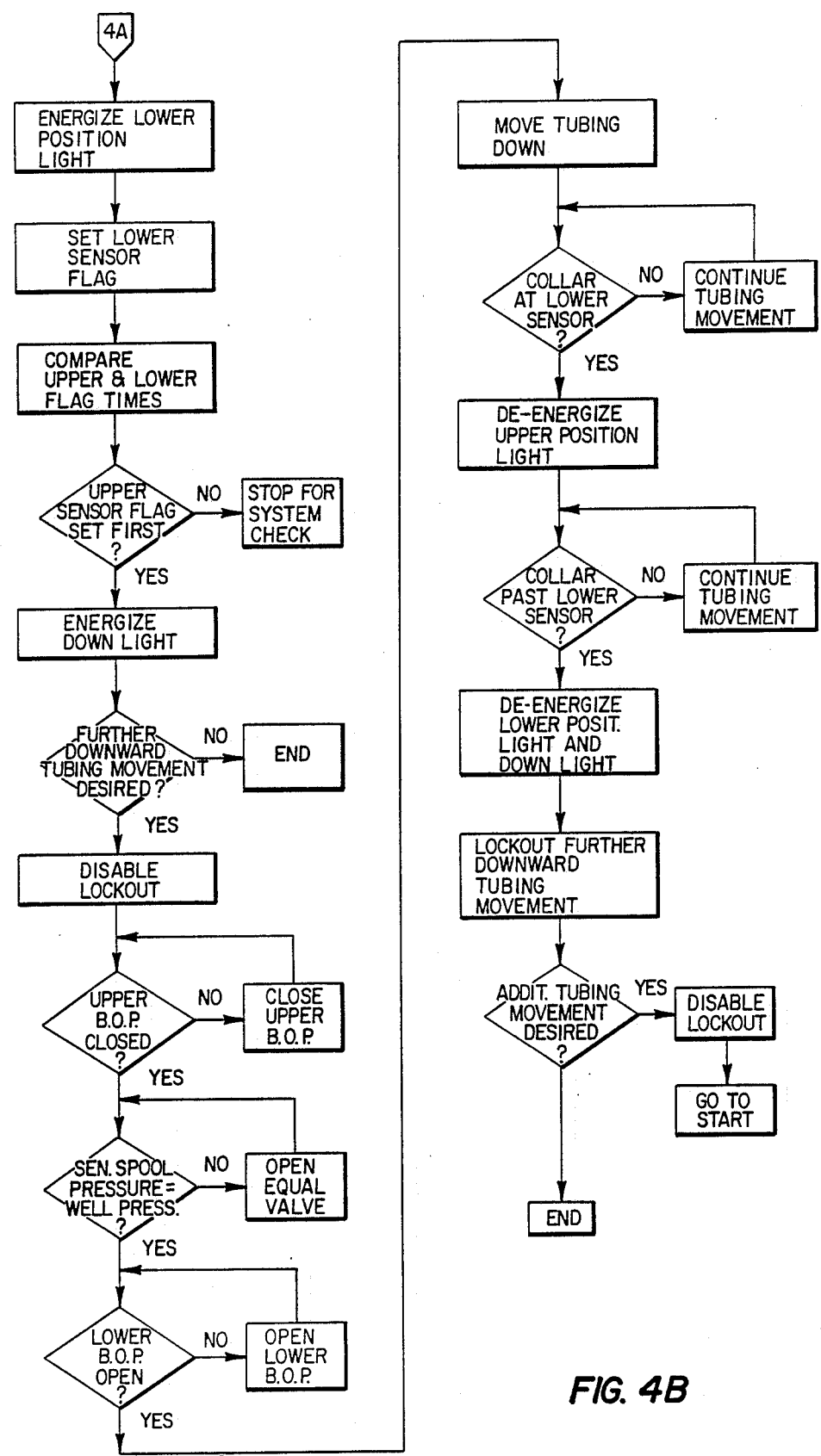

A representative flow diagram of the circuit 84 incorporated in the control panel 86 is illustrated in FIGS. 4A and 4B. It can be seen in such flow diagram that the circuit 84 may be utilized, via the use of upper and lower sensor "flags", to compare the time sequence of the energizations of the upper and lower coil lights 88 and 92 to thereby energize a "down" direction light 96 on the control panel to indicate to the operator that the collar 24 is moving downwardly through the riser spool section 14$_a$. As will be appreciated, the sequence in which the lights 88, 92 are illuminated will be reversed when the tubing string 12 is being moved upwardly through the riser spool 14, and corresponding circuitry may be employed to illuminate an "up" direction light 98 when the tubing string is being moved upwardly through the sensing collar.

In addition to these collar entry, position, and direction indicating functions provided by the circuit 84, the circuit may optionally be designed (as illustrated in FIGS. 4A and 4B) to include a safety circuit portion which is operative to prevent opening of either of the blowout preventers in the event that pressure conditions in the intermediate spool section 14$_a$ are not correct, and to generate a lockout signal usable to temporarily prevent further downward tubing movement through the riser spool after a tubing collar has become centered therein. The flow diagram illustrated in FIGS. 4A and 4B represents the circuitry portion used during downward tubing string movement. It will be appreciated that a corresponding, but operationally reversed, circuit may be utilized during upward tubing string movement.

As a further optional feature of the present invention, to further assist the operator in monitoring the operation of the snubbing unit, handle position indicating signals 100, 102, 104 and 106 from the operating handles 26$_b$, 28$_b$, 32$_b$ and 36$_b$, and pressure signals 108, 110 and 112 from the pressure sensing lines 38, 40 and 42 may be appropriately transmitted to the control panel 86. Additional circuitry in the control panel may then be used to appropriately combine such signals and responsively energize open/closed light sets 114, 116, 118 and 120 respectively indicating the open/closed positions of the upper blowout preventer, the lower blowout preventer, the equalizing valve, and the bleed-off valve. These open/closed light sets may be conveniently positioned on an optional portion 86$_a$ of the control panel 86.

While the sensing system 50 of the present invention is particularly well suited for use in the representatively illustrated snubbing unit 10, it may also be advantageously utilized in a variety of other wellbore-related applications in which it is desirable to accurately sense (via a detectable mass differential) the vertical position of a selected longitudinal portion of an elongated structure being raised out of or lowered into a well bore. As but one example, the sensing system could be used in wireline operations to indicate when the wireline tool string is fully up into the lubricator.

The foregoing detailed description is to be clearly understood as being given by way of illustration and example only, the spirit and scope of the present invention being limited solely by the appended claims.

What is claimed is:

1. Snubbing apparatus for vertically moving a tubing string into and out of a well bore, the tubing string including a duality of elongated tubing joints interconnected end-to-end by an enlarged diameter tubing collar, said snubbing apparatus comprising:

a vertically extending riser spool through which the tubing string may be axially moved into and out of the well bore;

vertically spaced upper and lower blowout preventers operatively mounted on said riser spool at opposite ends of a longitudinal section thereof, each of said upper and lower blowout preventers being individually closable to form a sliding pressure seal around a tubing joint portion of the tubing string, and individually openable to permit axial passage of the tubing collar therethrough;

means for selectively moving the tubing string upwardly or downwardly through said riser spool; and sensing means, including a sensor structure carried by said riser spool section, for detecting the entry of the tubing collar into said riser spool section through an opened one of said upper and lower blowout preventers, and responsively generating an output signal indicative of said entry, so that further vertical movement of the risen string may be reliably terminated prior to contact between the tubing collar and the closed other one of said upper and lower blowout preventers.

2. The snubbing apparatus of claim 1 wherein:
said sensing means are further operative to detect the vertical position of the tubing collar within said riser spool section and responsively generate an output signal indicative of said vertical position.

3. The snubbing apparatus of claim 2 wherein:
said sensing means are further operative to detect the direction of vertical movement of the tubing collar through said riser spool section and responsively generate an output signal indicative of said direction of vertical movement.

4. Snubbing apparatus for vertically moving a tubing string into and out of a well bore, the tubing string including a duality of elongated tubing joints interconnected end-to-end by an enlarged diameter tubing collar, said snubbing apparatus comprising:

a vertically extending riser spool through which the tubing string may be axially moved into and out of the well bore;

vertically spaced upper and lower blowout preventers mounted on said riser spool at opposite ends of a longitudinal section thereof, each of said upper and lower blowout preventers being individually closable to form a sliding pressure seal around a tubing joint portion of the tubing string, and individually openable to permit axial passage of the tubing collar therethrough;

means for selectively moving the tubing string upwardly or downwardly through said riser spool; and means for detecting and indicating the entry of the tubing collar into said riser spool section, the vertical position of the tubing collar within said riser spool section, and the direction of vertical travel of the tubing collar through said riser spool section, said means for detecting and indicating including:

electric induction coil means, operatively mounted on said riser spool section, past which the tubing collar may be moved as it traverses said riser spool section, and circuit means for supplying electrical power to said electric induction coil means at a predetermined frequency, detecting variations in the supplied electrical power attributable to variations in the vertical position of the tubing collar relative to said electric induction coil means, and responsively indicating the entry of the tubing collar into said riser spool section, the vertical position of the tubing collar within said riser spool section, and the direction of vertical travel of the tubing collar through said riser spool section.

5. The snubbing apparatus for claim 4 wherein said circuit means include:
frequency generator means connected to said electric induction coil means for supplying said electrical power thereto, and
phase comparator means, interconnected between said frequency generator means and said electric induction coil means for detecting supplied electrical power phase shifts and responsively generating output signals combinatively indicative of the entry of the tubing collar into said riser spool section, the vertical position of the tubing collar within said riser spool section, and the direction of vertical travel of the tubing collar through said riser spool section.

6. The snubbing apparatus of claim 4 wherein:
said electric induction coil means include a first electric induction coil outwardly circumscribing said riser spool section, and a second electric induction coil outwardly circumscribing said riser spool section and positioned below said fist electric induction coil.

7. The snubbing apparatus of claim 6 wherein:
said riser spool section is of an essentially nonmagnetic material.

8. The snubbing apparatus of claim 7 wherein:
said riser spool section is of a stainless steel material.

9. The snubbing apparatus of claim 4 further comprising:
safety circuit means for generating a lockout signal in response to entry of the tubing collar into said riser spool section said lockout signal being usable to automatically disable said means for selectively moving the tubing string.

10. The snubbing apparatus of claim 9 wherein:
said safety circuit means are further operative to sense the open/closed condition of each of said upper and lower blowout preventer and generate a lockout signal usable to disable said means for selectively moving the tubing string in the event that either of said upper and lower blowout preventers is in an improper open/closed condition.

11. The snubbing apparatus of claim 10 wherein:
said snubbing apparatus further comprises a bleed-off valve connected to said riser spool section and operable to vent the interior thereof to atmospheric pressure, and an equalizing line interconnected between said riser spool section and a portion of said riser spool positioned below said lower blowout preventer, said equalizing line having an equalizing valve positioned therein and operable to selectively bring the interior of said riser spool section to well pressure, and said safety circuit means are further operative to sense the open/closed condition of each of said bleed-off valve and said equalizing valve and generate a lockout signal usable to disable said means for selectively moving the tubing string in the event that either of said bleed-off valve and said equalizing valve is in an improper open/closed condition.

12. The snubbing apparatus of claim 4 further comprising:
means for sensing and recording the number of tubing collars traversing said riser spool section in a given vertical direction, whereby the length of the tubing string disposed beneath said lower blowout preventer may be accurately monitored.

13. The snubbing apparatus of claim 4 further comprising:
a bleed-off valve connected to said riser spool section and operable to vent thereof to atmospheric pressure,
an equalizing line intercommunicating the interiors of said riser spool section and a portion of said riser spool disposed beneath said lower blowout preventer,
an equalizing valve positioned in said equalizing line and operable to selectively elevate the pressure within said riser spool section to that of the well bore, and
means for providing a remote visual indication of the open/closed conditions of said upper and lower blowout preventers, said bleed-off valve and said equalizing valve.

14. The snubbing apparatus of claim 13 wherein:
said upper and low blowout preventers, said bleed-off valve and said equalizing valve are each hydraulically operated by handle means, and
said means for providing a remote visual indication include means for sensing the position of each of said handle means, and means for sensing the internal pressures of said riser spool section, a portion of said riser spool disposed above said upper blowout preventer, and a portion of said riser spool disposed below said lower blowout preventer.

15. Snubbing apparatus for vertically moving a tubing string into and out of a well bore, the tubing string including a duality of elongated tubing joints interconnected end-to-end by an enlarged diameter tubing collar, said snubbing apparatus comprising:
a vertically extending riser spool through which the tubing string may be axially moved into and out of the well bore;
vertically spaced upper and lower blowout preventers mounted on said riser spool at opposite ends of an essentially nonmagnetic longitudinal section thereof;
means for selectively moving the tubing string upwardly or downwardly through said riser spool; and
means for electromagnetically sensing the entry of the tubing collar into said riser spool section, said means for electromagnetically sensing including:
an electric induction coil coaxially circumscribing said riser spool section,
means for supplying electric power to said electric induction coil, and
means for detecting an electric power phase shift occasioned by entry of the tubing collar into said riser spool section, and responsively generating an output signal indicative of said entry.

16. A method of detecting the entry of a tubing string joint connecting collar into a longitudinal section of a riser spool disposed between upper and lower blowout preventers during axial tubing string movement through the riser spool, said method comprising the steps of:
securing an electric induction coil to the longitudinal riser spool section between the upper and lower blowout preventers;
supplying electrical power to said electric induction coil;
causing the tubing collar, as it enters said longitudinal riser spool section, to create a phase shift in said electrical power; and
detecting said phase shift and responsively generating an output signal indicative thereof.

17. A method of detecting the entry of a tubing string joint connecting collar into a longitudinal section of a riser spool through which the tubing string is vertically moved, the vertical position of the collar within the riser spool section, and the direction of vertical travel of the collar through the riser spool section, said method comprising the steps of:
securing upper and lower electric induction coils to the riser spool section;
supplying electrical power to each of said upper and lower electric induction coils;
causing the tubing collar, as it vertically traverses the riser spool section, to create phase shifts in the electrical power supplied to each of said upper and lower electrical induction coils; and
detecting said phase shifts and responsively generating output signals combinatively indicative of the entry of the tubing collar into the riser spool section, the vertical position of the tubing collar within the riser spool section, and the direction of vertical travel of the tubing collar through the riser spool section.

18. Apparatus for sensing the entry, into a predetermined longitudinal section of a pipe extending downwardly into a well bore, of a tubing collar portion of an elongated tubing string being axially moved through the interior of said pipe, said apparatus comprising:
electric induction coil means outwardly circumscribing said longitudinal section of said pipe;
circuit means for supplying electrical power to said electric induction coil means at a predetermined frequency, detecting variations in the supplied electrical power attributable to variations in the longitudinal position of said collar portion relative to said longitudinal section of the pipe, and responsively generating output signal means indicative of the entry of said collar portion into said longitudinal section of the pipe; and
isolating means for isolating the pipe interior above said section of pipe from the well bore pressure while permitting the axial passage of the tubing string through said section of pipe.

19. The apparatus of claim 18 wherein:
said output signal means are further indicative of the longitudinal position of said collar portion within said longitudinal section of the pipe.

20. The apparatus of claim 18 wherein:
said output signal means are further indicative of the direction of axial travel of said collar portion through said longitudinal section of the pipe.

21. The apparatus of claim 18 wherein:
said electric induction coil means include a plurality of electric induction coils each positioned on a different axial portion of said longitudinal section of the pipe.

22. The apparatus of claim 18 wherein:

said circuit means are operative to detect phase shifts in the electrical power supplied to said electrical induction coil means, said phase shifts being occasioned by variations in the axial proximity of said collar portion to said electric induction coil means.

23. The apparatus of claim 18 wherein:

said isolating means include a pair of spaced blowout preventers sealingly connected at opposite ends of said section of pipe, each of said blowout preventers being individually closable to form a sliding pressure seal around a tubing joint portion of the tubing string, and individually openable while the other of said blowout preventers remains closed to permit axial passage of said tubing collar therethrough.

24. The apparatus of claim 23 wherein:

said apparatus further includes sensing means carried by said section of pipe for detecting the entry of said tubing collar into said section of pipe through an opened one of said blowout preventers, and responsively generating an output signal indicative of said entry, so that further longitudinal movement of the tubing string may be reliably terminated prior to contact between said tubing collar and the closed other one of said blowout preventers.

* * * * *

UNITED STATES PATENT AND TRADEMARK OFFICE
CERTIFICATE OF CORRECTION

PATENT NO. : 4,964,462
DATED : October 23, 1990
INVENTOR(S) : Michael L. Smith

It is certified that error appears in the above-identified patent and that said Letters Patent is hereby corrected as shown below:

Col. 1, line 7, insert -- relates generally -- instead of "relates to generally"

Col. 1, line 40, insert -- , -- after "BOP's"

Col. 1, line 47, insert -- , -- after "opened"

Col. 1, line 48, insert -- ¶ -- after "BOP"

Col. 1, line 66, insert -- or depressurization -- after "pressurization"

Col. 2, line 6, insert -- it forcibly -- after "spool portion"

Col. 6, line 24, insert -- within the -- after "collar 24"

Col. 8, line 9, insert -- "down" direction -- after "energize a"

Col. 10, line 19, insert -- , -- after "means"

Signed and Sealed this

Twenty-seventh Day of October, 1992

Attest:

DOUGLAS B. COMER

Attesting Officer

Acting Commissioner of Patents and Trademarks